US006190443B1

(12) United States Patent
Ohashi et al.

(10) Patent No.: US 6,190,443 B1
(45) Date of Patent: Feb. 20, 2001

(54) POLISHING COMPOSITION

(75) Inventors: Keigo Ohashi; Hitoshi Kodama; Noritaka Yokomichi, all of Nishikasugai-gun (JP)

(73) Assignee: Fujimi Incorporated, Nishikasugai-gun (JP)

( * ) Notice: Under 35 U.S.C. 154(b), the term of this patent shall be extended for 0 days.

(21) Appl. No.: 09/386,292

(22) Filed: Aug. 31, 1999

(30) Foreign Application Priority Data

Sep. 1, 1998 (JP) .................................................. 10-247096

(51) Int. Cl.[7] ................................ B24B 1/00; C09K 3/14; C09G 1/02; H01L 21/8229; H01L 21/8239
(52) U.S. Cl. ................................... 106/3; 51/307; 51/308; 51/309; 216/89; 252/79.1; 252/79.4; 510/165; 510/397
(58) Field of Search ............................. 51/307, 308, 309; 106/3; 438/692, 693; 510/165, 395, 397; 252/79.1, 79.4, 79.2; 216/89

(56) References Cited

U.S. PATENT DOCUMENTS

| | | | | |
|---|---|---|---|---|
| 3,438,811 | * | 4/1969 | Harriman ................................... | 134/2 |
| 4,954,142 | * | 9/1990 | Carr et al. ............................... | 51/309 |
| 5,084,071 | * | 1/1992 | Nenadic et al. ......................... | 51/309 |
| 5,698,388 | * | 12/1997 | Waki ....................................... | 430/569 |
| 5,885,362 | * | 3/1999 | Morinaga et al. ........................ | 134/2 |
| 5,997,620 | * | 12/1999 | Kodama et al. ........................ | 51/308 |

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A polishing composition for polishing a memory hard disk, which comprises water and at least one abrasive selected from the group consisting of silicon dioxide, aluminum oxide, cerium oxide, zirconium oxide, titanium oxide, silicon nitride and manganese dioxide and which further contains an iron chelate complex dissolved in the composition, the iron chelate complex having a nitrogen-containing compound as a ligand, and the pH of the entire composition being from 6 to 10.

8 Claims, No Drawings

POLISHING COMPOSITION

The present invention relates to a polishing composition useful for final polishing of the surface of a magnetic disk substrate in the preparation of a substrate for a magnetic disk to be used for a memory hard disk, i.e. a memory device useful for e.g. a computer. More particularly, the present invention relates to a polishing composition to be used for the preparation of a memory hard disk represented by e.g. a Ni—P disk, a Ni—Fe disk, an aluminum disk, a boron carbide disk or a carbon disk, particularly a polishing composition which provides a high stock removal rate in a polishing process for finishing a highly specular surface with a good surface roughness and which, at the same time, is applicable to a production technique for obtaining an excellent finished surface which is useful for a magnetic disk device having a large capacity and a high recording density. Further, the present invention relates to a method for polishing a memory hard disk employing such a polishing composition.

There have been continuing efforts for miniaturization and larger capacity for memory hard disks to be used for magnetic disk devices which are one of memory media for e.g. computers, and magnetic media are being changed from conventional coating type media to thin film media prepared by sputtering, plating or other methods.

A disk substrate (hereinafter referred to simply as "a substrate") which is most widely used at present, is one having an electroless Ni—P plating film formed on a blank material. Here, the blank material is one obtained by fairing an aluminum or other base plate by lathe processing by diamond turning, lapping by means of a PVA grindstone prepared by fixing SiC grinding material or other methods for the purpose of parallelization or planarization. However, by such various fairing methods, a relatively large waviness can not completely be removed. And, the electroless Ni—P plating film will be formed along the waviness on the blank material. Accordingly, such a waviness will remain also on the substrate, and nodules or large pits will sometimes be formed. Here, the "nodules" are bulges having a diameter of at least about 50 $\mu$m, which are formed by bulging of a plating surface at such portions that impurities have been taken into the Ni—P plating film. The "pits" are dents formed by polishing on the surface of the substrate, and "fine pits" are dents having a diameter of less than about 10 $\mu$m, among them.

On the other hand, along with the increase in the capacity of memory hard disks, the surface recording density is increasing at a rate of a few tens % per year. Accordingly, the space on a memory hard disk occupied by a predetermined amount of recorded information, is narrower than ever, and the magnetic force required for recording tends to be weak. Accordingly, for recent magnetic disk devices, it is required to minimize the flying height of the head, which is a space between the magnetic head and the memory hard disk, and at present, the flying height of the head is reduced to a level of not higher than 0.15 $\mu$m.

Further, so-called texturing may sometimes be carried out to impart concentric circular scorelines to the substrate after polishing for the purposes of preventing sticking of the magnetic head for reading or writing information, to the memory hard disk and preventing non-uniformity of the magnetic field on the memory hard disk due to scorelines in a certain direction different from the rotational direction of the memory hard disk, formed on the substrate surface by polishing. Recently, for the purpose of further reducing the flying height of the head, light texturing is carried out wherein the scorelines formed on the substrate are further reduced, or a non-texture substrate free from scorelines, is employed which is not subjected to texturing. The technology to support such a low flying height of the magnetic head has also been developed, and the reduction of the flying height of the head is being increasingly advanced.

When a memory hard disk surface has a waviness, the head moves up and down following the waviness of the memory hard disk which is rotated at a very high speed. However, if the waviness exceeds a certain height, the head will no longer be able to follow the waviness, and the head will collide against the substrate surface, thus resulting in so-called "head crush", whereby the magnetic head or the magnetic medium on the memory hard disk surface may be damaged, which may cause trouble for the magnetic disk device, or which may cause an error in reading or writing information.

On the other hand, head crush may occur also when a micro protrusion of a few $\mu$m is present on the memory hard disk surface. Further, when a pit is present on a memory hard disk, it is likely that information can not completely be written in, thus leading to a defect of information so-called a "bit defect" or failure in reading the information, which causes an error.

Accordingly, it is important to minimize the surface roughness of the substrate in the polishing step i.e. the step prior to forming a magnetic medium, and at the same time, it is necessary to completely remove a relatively large waviness as well as micro protrusions, fine pits and other surface defects.

For the above purpose, it used to be common to carry out finishing by one polishing step by means of a polishing composition (hereinafter sometimes referred to as a "slurry" from its nature) comprising aluminum oxide or other various abrasives and water as well as various polishing accelerators. However, by the one polishing step, it has been difficult to satisfy all of the requirements for removing a relatively large waviness as well as surface defects such as nodules and large pits on the substrate surface and for minimizing the surface roughness within a certain period of time. Accordingly, a polishing process comprising two or more steps, has been studied.

In a case where the polishing process comprises two steps, the main purpose of the polishing in the first step will be to remove a relatively large waviness as well as surface defects such as nodules and large pits on the substrate surface, i.e. fairing. Accordingly, a polishing composition is required which has a high ability of correcting the above-mentioned waviness and surface defects without forming deep scratches which can not be removed by polishing in the second step, rather than minimizing the surface roughness.

The purpose of polishing in the second step i.e. finishing polishing, is to minimize the surface roughness of the substrate. Accordingly, it is important that the polishing composition is capable of minimizing the surface roughness and capable of preventing formation of micro protrusions, fine pits or other surface defects rather than it has a high ability for correcting a large waviness or surface defects as required for polishing in the first step. Further, from the viewpoint of the productivity, it is also important that the stock removal rate is high. So far as the present inventors are aware, in the conventional two step polishing, it was possible to obtain a substrate surface having a good surface roughness in the polishing in the second step, but the stock removal rate was very low and inadequate for practical production. The degree of the surface roughness is determined depending upon the process for producing the substrate, the final recording capacity as a memory hard disk and other conditions. However, depending upon the desired degree of surface roughness, a polishing process comprising more than two steps, may be employed.

For the above purpose, particularly in finishing polishing in two steps, it has been common to carry out polishing by means of a polishing composition prepared in such a manner that aluminum oxide or other abrasive is thoroughly pulverized and adjusted for proper particle size, water is added thereto, and aluminum nitrate or various organic acids and other polishing accelerators are incorporated thereto, or a polishing composition comprising colloidal silica and water. However, the polishing by means of the former polishing composition had a problem that the balance between the mechanical component and the chemical component was poor, and micro protrusions or fine pits tended to form. The polishing by means of the latter polishing composition had a problem such that the stock removal rate was so low that it took a long time for polishing, and the productivity was low, roll off (or "dub off") as an index of sagging of an end face of the substrate tended to deteriorate, or washing after the polishing tended to be difficult.

With respect to such problems, JP-A-10-204416 proposes a polishing composition comprising an abrasive and an iron compound. The polishing composition disclosed in this publication solves the above-mentioned problems, and it has a high stock removal rate and is capable of providing a polished surface with small surface roughness. However, as a result of a further study by the present inventors, it has been found that it may undergo gelation during storage for a long period of time, and as the pH of the polishing composition is acidic, it may present irritation to the skin of the user or may bring about corrosion to the polishing machine. Accordingly, there has been a room for improvements.

It is an object of the present invention to solve the above problems and to provide a polishing composition having the handling efficiency such as the storage stability or less irritation to the skin, improved in the finishing polishing of a substrate to be used for a memory hard disk.

The present invention provides a polishing composition for polishing a memory hard disk, which comprises water and at least one abrasive selected from the group consisting of silicon dioxide, aluminum oxide, cerium oxide, zirconium oxide, titanium oxide, silicon nitride and manganese dioxide and which further contains an iron chelate complex dissolved in the composition, the iron chelate complex having a nitrogen-containing compound as a ligand, and the pH of the entire composition being from 6 to 10.

Further, the present invention provides a method for preparing a memory hard disk, which comprises polishing a substrate for the memory hard disk by means of the above polishing composition.

The polishing composition for polishing a memory hard disk of the present invention has a high stock removal rate, and it is excellent in the handling efficiency such as the storage stability and less irritation to the skin and has the corrosiveness to e.g. a polishing machine suppressed.

The abrasive which is suitable for use as the main abrasive among the components of the polishing composition of the present invention, is selected from the group consisting of silicon dioxide, aluminum oxide, cerium oxide, zirconium oxide, titanium oxide, silicon nitride and manganese dioxide. The abrasive is not limited to any particular one of these, but is preferably silicon dioxide.

Silicon dioxide includes colloidal silica, fumed silica and many other types which are different in the methods for their production or in their properties.

Also, aluminum oxide includes α-alumina, δ-alumina, θ-alumina, κ-alumina and other morphologically different substances.

Cerium oxide includes trivalent and tetravalent ones from the oxidation numbers, and it includes hexagonal system, isometric system and face-centered cubic system ones from the crystal systems.

Zirconium oxide includes monoclinic system, tetragonal system and amorphous ones from the crystal systems. Further, it includes one called fumed zirconia from the method for its production.

Titanium oxide includes titanium monoxide, dititanium trioxide, titanium dioxide and others from the crystal systems. Further, it includes one called fumed titania from the method for its production.

Silicon nitride includes α-silicon nitride, β-silicon nitride, amorphous silicon nitride and other morphologically different silicon nitrides.

Manganese dioxide includes α-manganese dioxide, β-manganese dioxide, γ-manganese dioxide, δ-manganese dioxide, ε-manganese dioxide, η-manganese dioxide and others from its morphology.

For the composition of the present invention, these abrasives may be employed in optional combination as the case requires. When they are used in combination, the manner of the combination, and the proportions of the respective abrasives are not particularly limited.

The above abrasive is to polish a surface to be polished by a mechanical action as abrasive grains. Among them, the particle size of silicon dioxide is usually from 0.005 to 0.5 $\mu$m, preferably from 0.01 to 0.2 $\mu$m, as the average particle size obtained by the surface area measured by BET method. Likewise, the particle sizes of aluminum oxide, zirconium oxide, titanium oxide, silicon oxide and manganese dioxide are usually from 0.01 to 10 $\mu$m, preferably from 0.05 to 3 $\mu$m, as the average particle sizes measured by BET method. Further, the particle size of cerium oxide is usually from 0.01 to 10 $\mu$m, preferably from 0.05 to 3 $\mu$m, as the average particle size observed by a scanning electron microscope.

If the average particle sizes of these abrasives exceed the above-mentioned ranges, the surface roughness of the polished surface tends to be bad, or scratching is likely to result. On the other hand, if they are less than the above-mentioned ranges, the stock removal rate tends to be very low and impractical.

The content of the abrasive in the polishing composition is usually from 0.1 to 50 wt %, preferably from 1 to 25 wt %, based on the total amount of the composition. If the content of the abrasive is too small, the stock removal rate tends to be low. On the other hand, if it is too high, uniform dispersion tends to be hardly maintained, and the viscosity of the composition tends to be so high that the handling tends to be difficult.

Iron Chelate Complex

The polishing composition of the present invention contains an iron chelate complex. This iron chelate complex serves to promote the polishing action by a chemical action as a polishing accelerator. The valency of iron as the center metal of the iron chelate complex to be used may be any valency, but is preferably trivalent. Further, the iron chelate complex to be used is required to be dissolved in the composition.

The iron chelate complex to be used is not particularly limited so long as it does not impair the effects of the present invention. However, it is preferably one having at least one ligand selected from the group consisting of ethylenediaminetetraacetic acid, diethylenetriaminepentaacetic acid, propylenediaminetetraacetic acid, hydroxyethylethylenediaminetriacetic acid, glycol ether diaminetetraacetic acid, nitrilotriacetic acid, hydroxyethyliminodiacetic acid, dihydroxyethyl glycine and triethylenetetraaminehexaacetic acid, coordinated on an iron ion.

Such an iron chelate complex may be incorporated to the polishing composition by an optional method. For example, an iron chelate complex compound may be added to the polishing composition, or a water-soluble iron salt and a chelating agent which will be a ligand, may be dissolved in the polishing composition, so that the chelating agent will be coordinated on the iron ion in the composition.

In the case where the iron chelate complex compound is added to the polishing composition, an optional iron chelate complex may be employed. However, it is preferred to employ, for example, at least one compound selected from the group consisting of iron-diammonium ethylenediaminetetraacetate, iron-monoammonium ethylenediaminetetraacetate dihydrate, iron-monosodium ethylenediaminetetraacetate, iron-diammonium diethylenetriaminepentaacetate, iron-monosodium propylenediaminetetraacetate trihydrate, iron-monosodium glycol ether diaminetetraacetate trihydrate, iron-monosodium nitrilotriacetate hydrate, iron-monosodium hydroxyethyliminodiacetate hydrate, iron-ammonium dihydroxyethyl glycine, iron-monosodium hydroxyethylethylenediaminetriacetate hydrate and iron-ammonium triethylenetetraaminehexaacetate.

Also in the case where a water-soluble iron salt and a chelating agent are dissolved in the polishing composition so that the chelating agent will be coordinated on the iron ion in the polishing composition, an optional water-soluble iron salt and an optional chelating agent may be employed. However, if a complex salt is used as the water-soluble iron salt, it is likely that substitution of the ligand will not sufficiently be carried out, and the content of the iron chelate complex in the composition tends to be low, and a due care will be required in this respect.

As a useful iron salt, iron nitrate, iron sulfate, iron ammonium sulfate, iron perchlorate, iron chloride, iron citrate, iron ammonium nitrate or iron ammonium oxalate (the valency of iron may be divalent, trivalent or higher) may, for example, be mentioned. The chelating agent may, for example, be ethylenediaminetetraacetic acid, disodium ethylenediaminetetraacetate, diethylenetriaminepentaacetic acid, propylenediaminetetraacetic acid, hydroxyethylethylenediaminetriacetic acid, glycol ether diaminetetraacetic acid, nitrilotriacetic acid, hydroxyethyliminodiacetic acid, dihydroxyethyl glycine, triethylenetetraaminehexaacetic acid, oxalic acid, acetylacetone or 2,2'-bipyridine. Among them, ethylenediaminetetraacetic acid, disodium ethylenediaminetetraacetate, diethylenetriaminepentaacetic acid, propylenediaminetetraacetic acid, hydroxyethylethylenediaminetriacetic acid, glycol ether diaminetetraacetic acid, nitrilotriacetic acid, hydroxyethyliminodiacetic acid, dihydroxyethyl glycine or triethylenetetraaminehexaacetic acid is preferred.

The iron chelate complex compound, the water-soluble iron salt and the chelating agent may be used in combination at optional proportions. In a combined use, two or more iron chelate complex compounds may be used in combination, or a water-soluble iron salt or a chelating agent may be incorporated to an iron chelate complex compound.

The content of the iron chelate complex in the polishing composition of the present invention may vary depending upon the effect of the iron chelate complex, but it is usually preferably from 0.01 to 40 wt %, more preferably from 0.05 to 20 wt %, based on the total amount of the polishing composition. In a case where a water-soluble iron salt and a chelating agent are employed, it is preferred that the content of an iron chelate complex compound formed by them in the polishing composition, will be within the above-mentioned range.

By increasing the content of the iron chelate complex, the effects of the present invention tend to appear more strongly. However, if the content is too high, the degree of improvement tends to be small, and the economical demerit will increase, and not only that, the surface defects such as pits are likely to form.

Polishing Composition

The polishing composition of the present invention is prepared usually by mixing and dispersing an abrasive selected from the group consisting of silicon dioxide, aluminum oxide, cerium oxide, zirconium oxide, titanium oxide, silicon nitride and manganese dioxide in water at an optional concentration, and further dissolving the iron chelate complex compound (or a water-soluble iron salt and a chelating agent) therein. The method for dispersing or dissolving these components in water is optional. For example, they may be dispersed by stirring by a vane-type stirring machine or by ultrasonic dispersion. Further, the order of mixing them is optional, and either dispersion of the abrasive or dissolution of the iron chelate complex may be carried out first, or such dispersion and dissolution may simultaneously be carried out.

Further, at the time of preparing the above polishing composition, various known additives may further be added for the purposes of stabilizing or maintaining the quality of the product, or depending upon the type of the object to be treated, the polishing conditions or the necessity for other processing conditions. Preferred examples of such additives include (a) cellulose, carboxymethylcellulose and hydroxyethylcellulose, and other celluloses, (b) ethanol, propanol and ethylene glycol, and other water-soluble alcohols, (c) a sodium alkylbenzenesulfonate and a formalin condensate of naphthalenesulfonic acid, and other surfactants, (d) a lignin sulfonate and a polyacrylate, and other organic polyanionic substances, (e) a polyvinyl alcohol, and other water-soluble polymers (emulsifiers), (f) sodium arginate, potassium hydrogencarbonate, and other bactericides, and (g) soluble metal salts other than the iron compound.

Further, it is also possible to employ the above-mentioned abrasive or the polishing accelerator, which is suitable for use in the polishing composition of the present invention, as an auxiliary additive for the purpose other than as the abrasive, for example, for the purpose of preventing settling of the abrasive.

The polishing composition of the present invention has a pH range of from 6 to 10, preferably from 8 to 9. The polishing composition of the present invention may have its pH within such range by the incorporation of the main components. However, if the pH is outside this range, it is necessary to adjust the pH. If the pH is lower than this range, the storage stability tends to be poor, and gelation is likely to take place during storage. On the other hand, if the pH is higher than this range, no adequate stock removal rate is likely to be obtained. Further, the polishing composition of the present invention is close to so-called neutral, and even if in contact with the skin of the user, irritation is small.

Further, the polishing composition of the present invention may be prepared and stored or transported in the form of a stock solution having a relatively high concentration, and may be used by diluting it at the time of the actual polishing treatment. The above-mentioned preferred ranges of concentration are concentrations at the time of actual polishing treatment. Needless to say, when such a method of use is employed, the polishing composition will be a solution having a higher concentration in the state in which it is stored or transported. Further, from the viewpoint of the handling efficiency, it is preferred that the polishing composition is prepared in such a concentrated form.

Further, the polishing composition of the present invention has a characteristic that it is scarcely gelled even when it is made to have high concentration, since its pH is from neutral to weakly alkaline. Accordingly, it can be concentrated more than the conventional polishing compositions. Specifically, with a conventional polishing composition comprising colloidal silica and iron (III) nitrate as abrasives, the composition tends to be gelled when the concentration of colloidal silica becomes high. For example, with a slurry wherein the content of colloidal silica is at least 30 wt %, based on the total weight of the composition, if iron (III) nitrate is added in an amount of at least 15 wt %, the composition is likely to be gelled, and likewise, with a slurry wherein the content of colloidal silica is at least 40 wt %, gelation is likely to take place by an addition of only 5 wt % of iron (III) nitrate. Whereas, with regard to polishing composition of the present invention, even when at least 30 wt % of the iron chelate complex is added to a colloidal silica slurry having a high concentration of at least 40 wt % based on the total weight of the composition, gelation scarcely takes place, and the storage stability is excellent.

The detailed mechanism is not clearly understood with respect to the reason why the polishing composition of the present invention has a high stock removal rate and is scarcely gelled and excellent in storage stability. However, it may be explained as follows taking a Ni—P plated substrate as an example.

With respect to the reason for the high speed in polishing the Ni—P plating, it is considered that iron chelate complex serves to chemically modify the Ni—P plating surface to make it brittle, and the brittle Ni—P plating surface can readily be removed by the mechanical action of the abrasive. Further, it is considered that the iron chelate complex present in the slurry will contribute to the dispersed state of a certain specific abrasive of the present invention, so that formation of excessively large agglomerates is prevented.

Preparation of a Memory Hard Disk

The method for preparing a memory hard disk according to the present invention, comprises polishing a memory hard disk by means of the above-described polishing composition.

The substrate of the memory hard disk to be polished may, for example, be a Ni—P disk, a Ni—Fe disk, an aluminum disk, a boron carbide disk, a carbon disk or the like. Among them, it is preferred to employ a Ni—P disk or an aluminum disk.

The method for preparing a memory hard disk of the present invention may employ any conventional polishing method for a memory hard disk or any combination of polishing conditions, so long as the above-described polishing composition is used.

For example, as the polishing machine, a single side polishing machine, a double side polishing machine or other machines may be employed. Further, the polishing pad may be of a suede type, a non-woven type, a flocked type, a raising type or the like.

Further, the polishing composition used in the method for preparing a memory hard disk of the present invention has a high stock removal rate and at the same time provides a flat polished surface. Accordingly, the polishing process can be carried out in one step, or can be carried out in two or more steps under different polishing conditions. In a case where the polishing process is carried out into two or more steps, it is preferred that the polishing step employing the above-described polishing composition will be the final polishing step, i.e. the preliminarily polished substrate will be polished by means of the above-described polishing composition. More preferably, the polishing process comprises two steps i.e. a first polishing step employing a polishing composition other than the above-described polishing composition, and a second polishing step employing the above-described polishing composition.

Now, the polishing composition of the present invention will be described in further detail with reference to Examples. However, it should be understood that the present invention is by no means restricted to such specific Examples.

Preparation of Polishing Compositions

Firstly, as the abrasives, colloidal silica (primary particle size: 0.035 μm), fumed silica (primary particle size: 0.05 μm) and aluminum oxide (primary particle size: 0.20 μm) were prepared. These abrasives were respectively dispersed in water by means of a stirrer, and the additives as identified in Table 1 were added to obtain test samples of Examples 1 to 10 and Comparative Examples 1 to 13.

TABLE 1

| Ex. No. | Abrasive | | Additive | | |
|---|---|---|---|---|---|
| | Type | wt % | Type | wt % | pH |
| Ex. 1 | Colloidal silica | 15 | EDTA.Fe.NH$_4$.NH$_4$OH | 3 | 8–9 |
| Ex. 2 | Colloidal silica | 45 | EDTA.Fe.NH$_4$.NH$_4$OH | 9 | 8–9 |
| Ex. 3 | Colloidal silica | 15 | EDTA.Fe.NH$_4$.2H$_2$O | 3 | 6–7 |
| Ex. 4 | Colloidal silica | 15 | EDTA.Fe.Na.3H$_2$O | 3 | 6–7 |
| Ex. 5 | Colloidal silica | 15 | DTPA.Fe.NH$_4$.NH$_4$OH.H | 3 | 8–9 |
| Ex. 6 | Colloidal silica | 15 | PDTA.Fe.Na.H$_2$O | 3 | 6–7 |
| Ex. 7 | Fumed silica | 15 | EDTA.Fe.NH$_4$.NH$_4$OH | 3 | 8–9 |
| Ex. 8 | Aluminum oxide | 15 | EDTA.Fe.NH$_4$.NH$_4$OH | 3 | 8–9 |
| Ex. 9 | Cerium oxide | 15 | EDTA.Fe.NH$_4$.NH$_4$OH | 3 | 8–9 |
| Ex. 10 | Zirconium oxide | 15 | EDTA.Fe.NH$_4$.NH$_4$OH | 3 | 6–7 |
| Comp. Ex. 1 | Colloidal silica | 15 | (Nil) | — | >5 |
| Comp. Ex. 2 | Fumed silica | 15 | (Nil) | — | About 5 |
| Comp. Ex. 3 | Aluminum oxide | 15 | (Nil) | — | About 5 |
| Comp. Ex. 4 | Colloidal silica | 15 | Iron (III) nitrate | 3 | 5> |
| Comp. Ex. 5 | Colloidal silica | 45 | Iron (III) nitrate | 9 | 5> |
| Comp. Ex. 6 | Colloidal silica | 15 | Iron (III) sulfate | 3 | 5> |

TABLE 1-continued

| | Abrasive | | Additive | | |
|---|---|---|---|---|---|
| Ex. No. | Type | wt % | Type | wt % | pH |
| Comp. Ex. 7 | Colloidal silica | 15 | Ammonium iron (III) sulfate | 3 | 5> |
| Comp. Ex. 8 | Colloidal silica | 15 | Iron (III) perchlorate | 3 | 5> |
| Comp. Ex. 9 | Colloidal silica | 15 | Iron (III) chloride | 3 | 5> |
| Comp. Ex. 10 | Colloidal silica | 15 | Iron (III) citrate | 3 | 5> |
| Comp. Ex. 11 | Colloidal silica | 15 | Ammonium iron (III) citrate | 3 | About 6 |
| Comp. Ex. 12 | Colloidal silica | 15 | Ammonium iron (III) oxalate | 3 | About 6 |
| Comp. Ex. 13 | Colloidal silica | 15 | EDTA.4Na.4H$_2$O | 3 | 8–9 |

Preparation of Substrates for Polishing Tests

Substrates were prepared for carrying out polishing tests employing the above polishing compositions. In order to carry out the evaluation by polishing in two steps, firstly, substrates for the tests were prepared as follows.

Polishing Conditions (first step)

Object to be polished: 3.5" electroless Ni—P substrate

Polishing machine: single side polishing machine

Polishing pad: SURFINO 183 slice (manufactured by FUJIMI INCORPORATED)

Treating pressure: 80 g/cm$_2$

Platen rotational speed: 50 rpm

Polishing composition: DISKLITE-3471 (manufactured by FUJIMI INCORPORATED)

Dilution of the composition: 1:2 deionized water

Supply rate of the polishing composition: 15 cc/min

Polishing time: 5 minutes

Polishing Test

Then, using the above polishing composition and the substrate treated by the polishing in the first step, a polishing test was carried out. The conditions were as follows.

Polishing conditions (second step)

Object to be polished: 3.5" electroless Ni—P substrate (already polished in the first step)

Polishing machine: single side polishing machine

Polishing pad: POLILEX DG (manufactured by Rodel Inc., U.S.A.)

Treating pressure: 80 g/cm$_2$

Platen rotational speed: 50 rpm

Dilution of the composition: Non dilution

Supply rate of the polishing composition: 15 cc/min

Polishing time: 10 minutes

After the polishing, the substrate was sequentially cleaned and dried, and then, the weight reduction of the substrate by the polishing was measured. The polishing test was carried out three times for each sample, and the stock removal rate was obtained from the average. The obtained results were as shown in Table 2.

TABLE 2

| Ex. No. | Stock removal rate ($\mu$m/min) |
|---|---|
| Ex. 1 | 0.076 |
| Ex. 2 | 0.065 |
| Ex. 3 | 0.063 |
| Ex. 4 | 0.066 |
| Ex. 5 | 0.081 |
| Ex. 6 | 0.065 |
| Ex. 7 | 0.080 |
| Ex. 8 | 0.155 |
| Ex. 9 | 0.087 |
| Ex. 10 | 0.071 |
| Comp. Ex. 1 | 0.013 |
| Comp. Ex. 2 | 0.032 |
| Comp. Ex. 13 | 0.059 |

From the results shown in Table 2, it is evident hat the polishing compositions of the present invention have larger stock removal rates than the polishing compositions containing no iron chelate complex (Comparative Examples 1 and 2) or the polishing composition containing only the chelating agent outside he scope of the present invention (Comparative Example 13).

Further, the stability and the corrosiveness were examined under the following conditions.

Stability test

The test samples of Examples 1 to 10 and Comparative Examples 1 to 13 were left to stand at room temperature (about 25° C.) for 120 days, whereupon the state of sedimentation of abrasive grains in each test sample was visually inspected to evaluate the stability. The evaluation standards were as follows.

⊚: No sedimentation of abrasive grains due to gelation was visually observed.

○: Sedimentation of abrasive grains due to gelation was slightly visually observed, but it was not of a problematic level.

X: Sedimentation of abrasive grains due to gelation was visually observed, and it was of a problematic level.

Corrosion Test

SUS304 plates were immersed in the test samples of Examples 1 to 10 and Comparative Examples 1 to 13 at room temperature (about 25° C.) for ten days, whereupon the plates were taken out and cleaned. Then, the surface of each plate was visually inspected to evaluate the corrosiveness. The evaluation standards were as follows.

⊚: No color change due to rust was visually observed.

X: A color change due to rust was observed, and it was of a problematic level.

The obtained results are shown in Table 3.

TABLE 3

| Ex. No. | Stability | Corrosiveness |
|---|---|---|
| Ex. 1 | ⊚ | ⊚ |
| Ex. 2 | ○ | ⊚ |
| Ex. 3 | ⊚ | ⊚ |
| Ex. 4 | ⊚ | ⊚ |
| Ex. 5 | ⊚ | ⊚ |
| Ex. 6 | ⊚ | ⊚ |
| Ex. 7 | ○ | ⊚ |
| Ex. 8 | ⊚ | ⊚ |
| Ex. 9 | ⊚ | ⊚ |
| Ex. 10 | ⊚ | ⊚ |
| Comp. Ex. 1 | ⊚ | ⊚ |
| Comp. Ex. 2 | ○ | ⊚ |

TABLE 3-continued

| Ex. No. | Stability | Corrosiveness |
| --- | --- | --- |
| Comp. Ex. 3 | ◎ | ◎ |
| Comp. Ex. 4 | ○ | X |
| Comp. Ex. 5 | X | X |
| Comp. Ex. 6 | ○ | X |
| Comp. Ex. 7 | ○ | X |
| Comp. Ex. 8 | ○ | X |
| Comp. Ex. 9 | ○ | X |
| Comp. Ex. 10 | ○ | X |
| Comp. Ex. 11 | ○ | X |
| Comp. Ex. 12 | ○ | X |
| Comp. Ex. 13 | ◎ | ◎ |

From the results shown in Table 3, it is evident that the polishing compositions of the present invention have their stability and less corrosiveness not deteriorated as compared with the polishing compositions containing no additive, and they are remarkably improved in the stability and less corrosiveness over the polishing compositions containing iron compounds other than the iron chelate complex (Comparative Examples 4 to 12).

As described in the foregoing, the polishing composition of the present invention has a high stock removal rate, and it is excellent in the handling efficiency such as the storage stability and less irritation to the skin and has the corrosiveness to e.g. a polishing machine suppressed.

What is claimed is:

1. A method for preparing a memory hard disk, which comprises polishing a memory hard disk substrate with a polishing composition which comprises water and at least one abrasive selected from the group consisting of silicon dioxide, aluminum oxide, cerium oxide, zirconium oxide, titanium oxide, silicon nitride and manganese dioxide and which further contains an iron chelate complex dissolved in the composition, the iron chelate complex having a nitrogen-containing compound as a ligand, and the entire composition having a pH of from 6 to 10, wherein the substrate is selected from the group consisting of Ni—P Ni—Fe, aluminum, boron carbide, and carbon.

2. A The method according to claim 1, wherein the iron chelate complex is one having at least one ligand selected from the group consisting of ethylenediaminetetraacetic acid, diethylenetriaminepentaacetic acid, propylenediaminetetraacetic acid, hydroxyethylethylenediaminetriacetic acid, glycol ether diaminetetraacetic acid, nitrilotriacetic acid, hydroxyethyliminodiacetic acid, dihydroxyethyl glycine and triethylenetetraaminehexaacetic acid, coordinated on an iron ion.

3. The method according to claim 1, wherein the iron chelate complex is incorporated in the form of at least one compound selected from the group consisting of iron-diammonium ethylenediaminetetraacetate, iron-monoammonium ethylenediaminetetraacetate dihydrate, iron-monosodium ethylenediaminetetraacetate, iron-diammonium diethylenetriaminepentaacetate, iron-monosodium propylenediaminetetraacetate trihydrate, iron-monosodium glycol ether diaminetetraacetate trihydrate, iron-monosodium nitrilotriacetate hydrate, iron-monosodium hydroxyethyliminodiacetate hydrate, iron-ammonium dihydroxyethyl glycine, iron-monosodium hydroxyethylethylenediaminetriacetate hydrate and iron-ammonium triethylenetetraminehexaacetate.

4. The method according to claim 1, wherein the content of the abrasive is from 0.1 to 50 wt %, based on the total weight of the polishing composition.

5. The method according to claim 1, wherein the content of the iron chelate complex is from 0.01 to 40 wt %, based on the total weight of the polishing composition.

6. The method according to claim 1, wherein the substrate is Ni—P.

7. The method according to claim 1, wherein the at least one ligand is selected from the group consisting of ethylenediaminetetraacetic acid, diethylenetriaminepentaacetic acid, and propylenediaminetetraacetic acid.

8. The method according to claim 6, wherein the at least one ligand is selected from the group consisting of ethylenediaminetetraacetic acid, diethylenetriaminepentaacetic acid, and propylenediaminetetraacetic acid.

* * * * *